Sept. 16, 1952     W. P. OEHLER ET AL     2,610,454
DISK GANG BIASING MEANS

Filed Aug. 28, 1948     2 SHEETS—SHEET 2

INVENTORS.
WILLIAM P. OEHLER
CHARLES H. YOUNGBERG
BY
ATTORNEYS

Patented Sept. 16, 1952

2,610,454

UNITED STATES PATENT OFFICE 2,610,454

DISK GANG BIASING MEANS

William P. Oehler and Charles H. Youngberg, Moline, Ill., assignors to Deere & Company, Moline, Ill., a corporation of Illinois Application August 28, 1948, Serial No. 46,686

3 Claims. (Cl. 55—81)

The present invention relates generally to agricultural implements and is more particularly concerned with disk harrows, such as those of the type shown in U. S. Patent 2,339,124, issued January 11, 1944, to Charles H. White.

The object and general nature of the present invention is the provision of new and improved spring means acting between the frame of the disk harrow and the two disk gangs movably connected with the frame so as to hold the outer ends of the gangs, when in operation, from being displaced upwardly due to the pressure of the soil against the disks.

More specifically, it is an important feature of this invention to provide new and improved upthrust resisting spring means which is simpler, and involves a smaller number of parts and is less expensive to manufacture than the upthrust resisting spring means shown in the above mentioned patent.

Still further, another feature of the present invention is the provision of spring means acting between the disk gang and the frame of the harrow and so constructed and arranged as to be effectively connected with the associated disk gang without the use of pins, cotters or the like, and furthermore, it is an additional feature of this invention to provide a simple connection between the upthrust resisting spring unit and the harrow frame which involves only one bracket fixedly connected to the harrow frame.

These and other objects and advantages of the present invention will be apparent to those skilled in the art after a consideration of the following detailed description, taken in conjunction with the accompanying drawings, in which.

Figure 4:
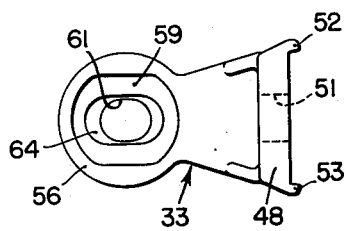
Figure 5:
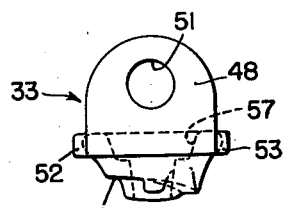
Figure 6:
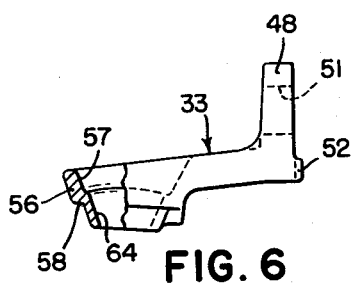

Figures 4–6, inclusive, are detail views of the spring bracket which connects each of the spring units to the harrow frame.

Figure 1:
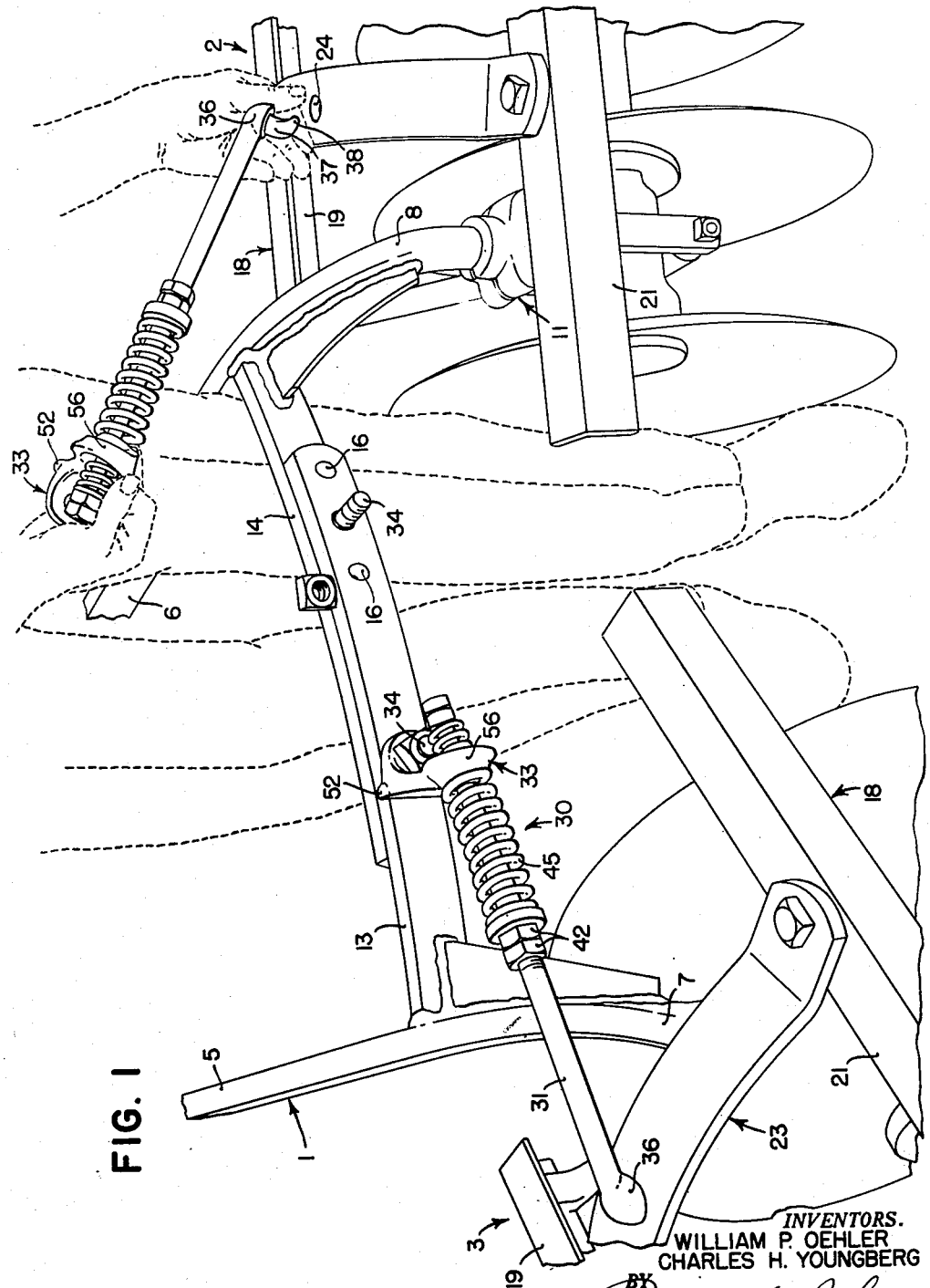
Figure 1 is a perspective view of the rear portion of a disk harrow in which the principles of the present invention have been incorporated, one of the spring upthrust resisting units being shown in the position it occupies during the process of connecting the same between the associated disk gang and the frame.
Figure 2:
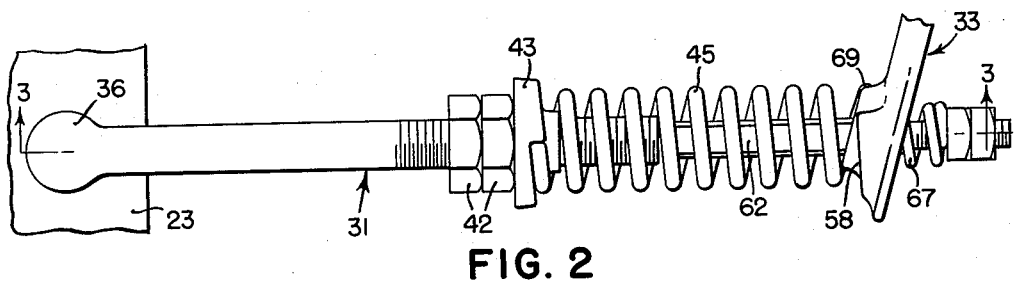
Figure 2 is a partial plan view of the preferred form of upthrust resisting spring means.
Figure 3:
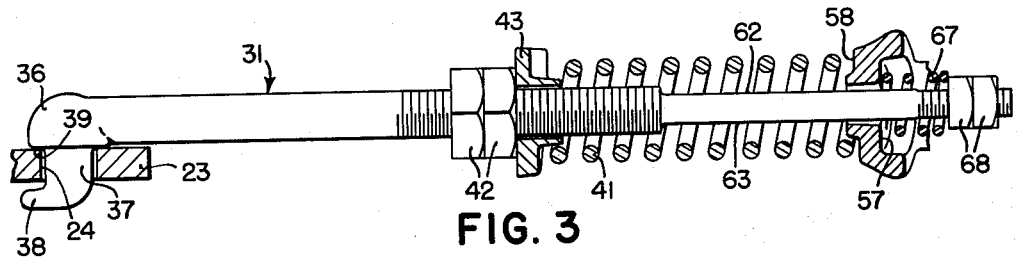
Figure 3 is a sectional view taken generally along the line 3—3 of Figure 2.

Referring now to the drawings, the disk harrow is shown in Figure 1 as including a main frame 1 and a pair of right and left hand disk gangs 2 and 3. The main frame 1 comprises generally fore and aft extending bars 5 and 6 which at their rear ends terminate in downwardly extending bearing-receiving portions 7 and 8. Each of the latter portions is connected into a bearing structure 11 carried at the inner end of each of the disk gangs 2 and 3. The main frame 1 also includes a pair of cross bars 13 and 14 connected, as by welding, at their outer ends to the frame bars 5 and 6 and having overlapping portions at their inner ends, which are apertured, as indicated by the reference numeral 16.

Each of the disk gangs 2 and 3 includes a gang frame 18 which is made up of fore and aft spaced transverse angle members 19 and 21, the inner and outer ends of which are provided with suitable yokes or supports and associated bearing means whereby each gang frame is carried by the associated disk gang and moved therewith relative to the main frame 1 either in a fore and aft direction about a generally vertical axis or in an up and down direction about generally fore and aft extending axes. The bearing means 11 and associated parts accommodate the aforesaid action. The inner ends of the frame bars 19 and 21 are interconnected by means of an arched brace member 23 secured, as by bolts, to the main frame. The central portion of each of the gang braces 23 is provided with an aperture 24 which pivotally receives the associated upthrust resisting spring unit, one of which is connected between each of the braces 23 and the associated frame 1.

Each of the upthrust resisting spring units is indicated by the reference numeral 30 and comprises a spring rod 31 pivotally connected at its outer end to the associated gang frame brace 23 and slidably and pivotally connected at its inner end with an associated connecting bracket 33 that is fastened rigidly to the frame by one of the bolts 34 which extends through registering openings in the main frame cross bars 13 and 14 for holding them in different positions of lateral adjustment.

The outer end of each of the rods 31 is specially formed to provide for quick attachment and deachment. The outer end of each of the rods 31 is formed with an enlarged portion 36 which carries a reduced brace-engaging neck portion 37 which is adapted to be disposed in the aperture 24 in the associated brace 23. The neck portion 37 terminates in a laterally directed hook-like portion 38, and an abutment shoulder 39 lies between the enlarged portion 36 and the neck portion 37. As best shown in Figure 1, the rod 31 is easily and quickly connected with the associated brace 23 merely by first inserting the hook-like portion 38 down through the opening 24, with the rod 31 held at an angle, until the neck portion 37 lies in the opening 24, after which the rod 31 may be brought down into its normally generally horizontal position with the abutment shoulder 39 engaging the upper face of the brace 23 and the lower hook-like portion 38 engaging the lower face of the brace 23, whereby the rod 31 cannot be disengaged from its brace 23 so long as the rod 31 remains in a substantially horizontal position. The rod 31 is adapted to pivot in a generally fore and aft direction relative to the associated gang frame and the fit between the neck portion 37 and the opening 24 is such that the rod 31 may also swing up and down relative to the brace 23 to a limited extent.

The generally central portion of each of the spring rods 31 is screw threaded, as shown at 41, and receives a pair of lock nuts 42 against which a spring collar 43 is adapted to bear. The outer face of the collar 43 is formed so as to receive one end of a spring 45 which is adapted to be disposed about the inner end portion of the rod 31. The other end of the spring 45 is adapted to bear against one leg of the spring bracket 33 which is carried by the main frame 1.

As best shown in Figures 4-6, one leg 48 of the bracket 33 is formed with an aperture 51 therein to receive the associated bolt 34. This leg of the bracket also carries a pair of upper and lower lugs 52 and 53 which are adapted to overlie the upper and lower edges of the adjacent frame bar 13 so as to prevent the bracket from turning relative to the harrow frame. When the bolt 34 is inserted through the opening 51 and the nut applied and tightened, the bracket 33 becomes a fixed and rigid part of the harrow frame. However, if it should be desired to change the spacing between the disk gangs 2 and 3, it is a simple matter to take out the bolt 34 and reinsert the same into other holes in the transverse frame bars 13 and 14, reconnecting the bracket 33 as just described.

The outer and spring rod receiving section or leg of the bracket 33 is indicated by the reference numeral 56 and is preferably formed integral with the leg 48. The leg 56 of the bracket 33 is provided at its opposite sides with an inner socket section 57 and an outer socket section 58, the wall 59 between said sections being provided with an elongated opening or slot 61. The rod 31 outwardly of the threaded portion 41 is flattened on its upper and lower sides, as shown at 62 and 63, and this portion is slidably disposed in the elongated bracket opening 61. The upper and lower sides of the opening 61 are substantially flat and cooperate with the flat sides 62 and 63 of the rod 31, thereby providing adequate bearing surface between the bracket and spring rod and thus eliminating all objectionable wear. The opening 61 is tapered so as to accommodate both a fore and aft swinging movement of the rod 31 in the bracket as well as a generally up and down swinging movement of the rod relative to the bracket. The taper of the opening 61 is indicated by the reference numeral 64. The outer or flattened end portion of each rod 31 extends through the elongated slot 61 a distance sufficient to receive a small cushioning spring 67 one end of which seats in the socket 57 and the other end of which bears against a pair of lock nuts 68 which are carried by the threaded portion at the outermost end of the rod 31. The main thrust resisting action is performed by the larger spring 45 mentioned above. The innermost end of the spring 45 seats against the outer socket section 58 of the bracket leg 56, the socket section 58 being tapered and formed with a helical or spiral spring seat 69 shaped to conform to the end of the associated spring 45. The bracket 33 is formed with the leg 56 extending at an angle to the bracket leg 48. This results in the associated spring 45 bearing with full and uniform pressure against the seat 69 when the harrow is in its angled or working position.

At the outer end of each of the upthrust resisting springs 45 the associated collar 43 is also formed with a helical or spiral spring seat, and the member 43 is held in position by the lock nuts 42. Changing the position of the lock nuts 42 along the rod 31 serves to increase or decrease the tension exerted by the associated spring 45 when the harrow is in its normal working position.

While we have shown and described above the preferred structure in which the principles of the present invention have been incorporated, it is to be understood that our invention is not to be limited to the particular details shown and described above, but that, in fact, widely different means may be employed in the broader aspects of our invention.

What we claim, therefore, and desire to secure by Letters Patent is:

1. In a disk harrow of the type including a main frame and a pair of disk gangs connected at their inner ends with said frame for movement relative thereto about generally horizontal fore and aft extending and vertical axes, the improvement which comprises spring means for resisting upthrust at the outer ends of said gangs due to soil pressure against the disks, said means including an apertured bracket fixed to the inner end of each of said gangs, a spring rod for connecting each bracket to said main frame and having at its outer end an abutment shoulder and a hook-like end having a first portion extending axially of said abutment shoulder and a right angular portion, said hook-like end being adapted to be interengaged with the aperture in the associated bracket so that said abutment shoulder engages the associated bracket at one side thereof and said right angular portion extends through the aperture in said bracket and lies against the other side thereof so as to serve to hold the rod engaged with the bracket while accommodating rocking and pivotal movement of the gang relative to the rod, a pair of brackets fixed to said main frame, each of said last named brackets having an aperture adapted to receive the inner end of the associated spring rod, and a spring acting between each rod and the associated main frame bracket.

2. In a disk harrow of the type including a main frame and a pair of disk gangs connected at their inner ends with said frame for movement relative thereto about generally horizontal fore and aft extending and vertical axes, the improvement which comprises spring means for resisting upthrust at the outer ends of said gangs due to soil pressure against the disks, said spring means including an apertured bracket fixed to the inner end of each of said gangs, a spring rod for connecting each bracket to said main frame and having at its outer end an abutment shoulder and a hook-like end having a first portion extending axially of said abutment shoulder and a right angular portion, said hook-like end being adapted to be interengaged with the aperture in the associated bracket so that said abutment shoulder engages the associated bracket at one side thereof and said right angular portion extends through the aperture in said bracket and lies against the other side thereof so as to serve to hold the rod engaged with the bracket while accommodating rocking and pivotal movement of the gang relative to the rod, a pair of brackets adapted to be fixed to said frame, each of said last named brackets having an aperture adapted to receive the inner end of the associated spring rod, said apertured portion of each bracket including a laterally outwardly facing generally tapered part having a spiral-like spring seat and a laterally inner tapered recessed part forming a spring-receiving socket, the laterally inner end of the associated rod extending through the associated aperture, a cushioning spring disposed about the inner end of said rod and connected at one end to the inner end of the rod and seating at the other end in said spring-receiving socket, and an upthrust-resisting spring connected at its laterally outer end to each rod and disposed at its laterally inner end over the laterally outwardly facing tapered part of the associated bracket and seating in the spiral-like seat of said bracket.

3. In a disk harrow of the type including a main frame and a pair of disk gangs connected at their inner ends with said frame for movement relative thereto about generally vertical axes into and out of angled working position, the improvement which comprises spring means for resisting upthrust at the outer ends of said gangs due to soil pressure against the disks, said spring means including a spring rod pivotally connected at its outer end to each of said gangs and extending laterally inwardly therefrom, a pair of brackets adapted to be fixed to said frame, each of said last named brackets having an aperture adapted to receive the inner end of the associated spring rod, said apertured portion of each bracket including a laterally outwardly facing, generally tapered part having a spiral-like spring seat and a laterally inner tapered recessed part forming a spring-receiving socket, the laterally inner end of the associated rod extending through the associated aperture, a cushioning spring disposed about the inner end of said rod and connected at one end to the inner end of the rod and seating at the other end in said spring-receiving socket, and an upthrust-resisting spring connected at its laterally outer end to each rod and disposed at its laterally inner end over the laterally outwardly facing tapered part of the associated bracket and seating in the spiral-like seat of said bracket.

WILLIAM P. OEHLER.
CHARLES H. YOUNGBERG.

REFERENCES CITED

The following references are of record in the file of this patent:

UNITED STATES PATENTS

| Number | Name | Date |
| --- | --- | --- |
| Re. 22,333 | White | June 8, 1943 |
| 585,136 | Todd | June 22, 1897 |
| 1,140,940 | Bales | May 25, 1915 |
| 1,577,233 | Hotto | Mar. 16, 1926 |
| 2,320,015 | Seaholm | May 25, 1943 |
| 2,339,124 | White | Jan. 11, 1944 |